(12) United States Patent
Moss

(10) Patent No.: US 8,480,896 B2
(45) Date of Patent: Jul. 9, 2013

(54) SCAVENGING FILTER

(75) Inventor: Martin Moss, Lancashire (GB)

(73) Assignee: Madison Filter 981 Ltd., Haslingden, Lancashire (GB)

( * ) Notice: Subject to any disclaimer, the term of this patent is extended or adjusted under 35 U.S.C. 154(b) by 777 days.

(21) Appl. No.: 12/066,536

(22) PCT Filed: Sep. 14, 2006

(86) PCT No.: PCT/GB2006/003426
§ 371 (c)(1),
(2), (4) Date: May 21, 2008

(87) PCT Pub. No.: WO2007/031766
PCT Pub. Date: Mar. 22, 2007

(65) Prior Publication Data
US 2008/0290019 A1 Nov. 27, 2008

(30) Foreign Application Priority Data

Sep. 14, 2005 (GB) .................... 0518704.2

(51) Int. Cl.
*B01D 24/00* (2006.01)
*B01D 24/38* (2006.01)
*B01D 24/16* (2006.01)
*B01D 27/02* (2006.01)
*B01D 39/00* (2006.01)

(52) U.S. Cl.
USPC ........... 210/287; 210/266; 210/289; 210/293; 210/291; 210/352; 210/435; 210/437; 210/438; 210/439; 210/446; 210/455; 210/456; 210/502.1

(58) Field of Classification Search
USPC .......................................... 210/293, 287, 288
See application file for complete search history.

(56) References Cited

U.S. PATENT DOCUMENTS

| | | | | |
|---|---|---|---|---|
| 2,758,719 | A | * 8/1956 | Line | 210/288 |
| 3,204,770 | A | * 9/1965 | Brink | 210/282 |
| 4,636,307 | A | 1/1987 | Inoue et al. | |
| 4,692,246 | A | * 9/1987 | Simon | 210/232 |
| 5,071,551 | A | 12/1991 | Muramatsu et al. | |
| 5,186,830 | A | * 2/1993 | Rait | 210/232 |
| 5,308,482 | A | * 5/1994 | Mead | 210/207 |
| 5,612,522 | A | 3/1997 | Levy | |
| 6,227,382 | B1 | 5/2001 | Cutler et al. | |
| 6,471,864 | B1 | * 10/2002 | Sublette et al. | 210/616 |

FOREIGN PATENT DOCUMENTS

| | | |
|---|---|---|
| CA | 1306199 C | 8/1992 |
| DE | 10244915 | 4/2004 |
| JP | 60220107 | 11/1985 |
| WO | 0233135 A1 | 4/2002 |
| WO | 2005016510 A1 | 2/2005 |

* cited by examiner

*Primary Examiner* — Benjamin Kurtz
(74) *Attorney, Agent, or Firm* — Barlow, Josephs & Holmes, Ltd.

(57) ABSTRACT

A scavenging filter includes a volume containing activated beads or fiber particles of a scavenging material housed in a removable housing in a cartridge filter body having an axial inlet extending to a space below a permeable false bottom, the fluid permeating upwards through the material, and cleaned liquor leaving via an annular space surrounding the chamber.

6 Claims, 2 Drawing Sheets

SCAVENGING FILTER

This invention relates to a scavenging filter structure, for use for example in removing contaminants from a liquid medium, such as for example removal of heavy metals from water.

Such contaminants may be removed by being contacted with scavenging materials in finely divided form such as fibers or microcapsules.

The finely divided nature of such materials gives rise to practical problems in handling the same, and the beads or the like become electrostatically charged and adhere to surface such as the walls of containment vessels, and tubes or ducts so that it is difficult to ensure that all of the spent material is removed during clean down and exchanging of saturated beads for a charge of fresh fully activated beads.

At present, activated beads are added directly to the liquor which contains the heavy metal contaminants, to scavenge these from the water, by attracting them to and bonding to the particles. The particles are then recovered from the liquor by passing the latter through a filter or strainer having a mesh size such as to retain the beads or fibers, but pass the liquor.

It is an object of the invention to provide an arrangement whereby the beads or other scavenging particles may be contained in such a manner as to be readily introduced into and removed from a vessel or fluid stream, so that the particles are reliably and securely contained for ease of handling, but are disposed so that they can be contacted by the fluid stream so that the particles can effectively scavenge contaminants from the fluid stream.

As the beads or other scavenging particles have a finite capacity for removing contaminants, it is desirable to ensure that all particles are used to their fullest capacity. Air pockets or dry regions would contain beads which do not absorb metals, and if they are not immobilized their lightweight anti-static properties, will tend to float on the liquid so that again their full scavenging capacity is not used. It is thus a preferred further object of the invention to ensure full contact of the fluid by achieving even flow of the fluid through the scavenging particles.

According to the invention a scavenging medium is contained within a cartridge which has walls to contain the scavenging medium, and inlet and outlet means to permit flow of a liquid medium through the scavenging medium.

The scavenging medium is advantageously a finely divided activated material in the form for example of beads or fibers for example incorporating a catalyst and/or a liquid for scavenging heavy metals from the liquid medium by linking them chemically to the material, such as described in WO 2005/016510, or fibers of a polymer such as a polyolefin which are functionalized by radiation grafting of one or more monomers to bind the metal to the polymer, such as described in WO 02/33135.

Structurally, the cartridge may resemble a cartridge filter as used for more conventional filtration of solids from liquid or gas fluid streams. In a preferred embodiment the cartridge may comprise a cylindrical chamber for holding a quantity of the scavenging medium. The cylindrical chamber may have an outer wall which is spaced from a boundary wall of the cartridge to provide an annular cross-sectioned space for flow outside of the chamber, there being means for allowing fluid flow from the chamber to the annular space. The chamber may also have a central tube extending axially down through the chamber, to open into a space below the chamber separated there from by a false bottom which may be a diffusion filter comprising a mesh or a sintered porous member which allows liquid to pass up into the chamber, but having a pore or mesh size such as to retain the scavenging medium in the chamber. The false bottom helps to achieve the preferred object of the invention by allowing fluid to collect below the chamber of scavenging material, before passing evenly through the chamber.

The upper end of the cartridge may be formed with a funnel member which directs liquid into the central tube, to enter the space below the false bottom.

A compression mesh may be provided on top of the medium in the chamber and pressed by a spring into contact with the medium, the other end of the spring being seated on the inner face of the funnel member.

The funnel member may be covered by a filter mesh through which the liquid passes into the funnel, the mesh acting as a strainer to remove solids from the liquid prior to entry into the scavenging chamber.

Embodiments of scavenging filter according to the invention will now be described by way of example, with reference to the accompanying drawings, wherein.

Figure 1:
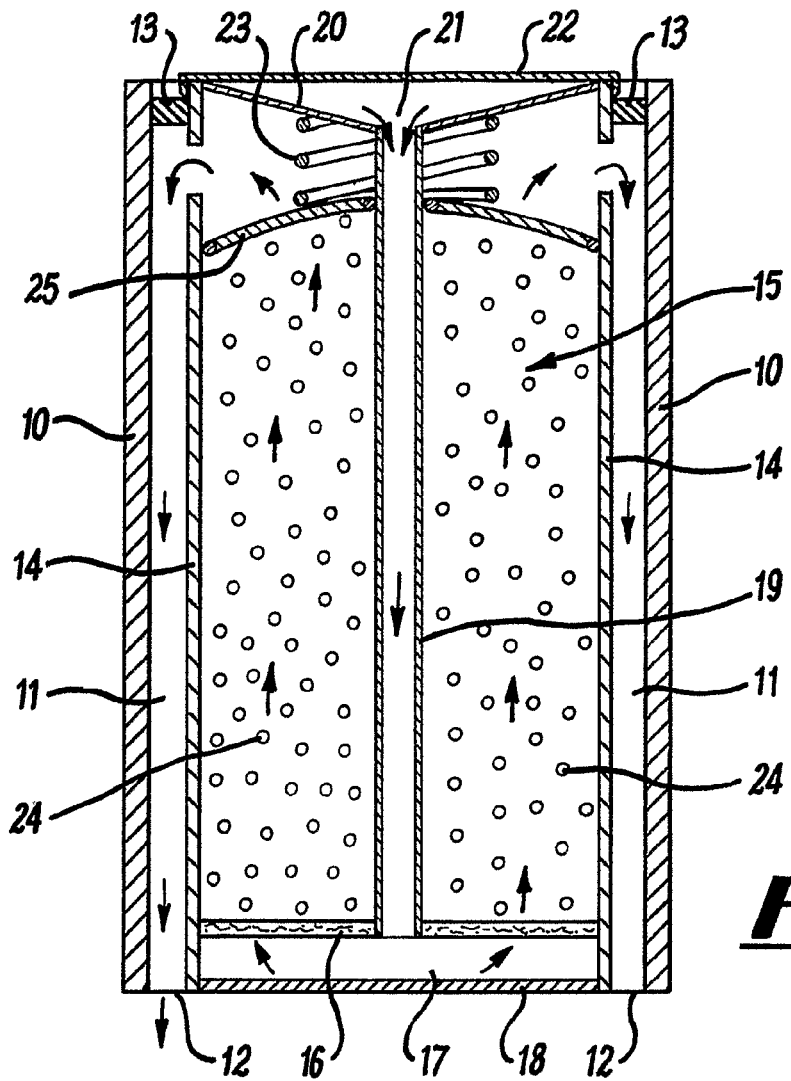
FIG. 1 is a cross-sectional view of a first embodiment of a scavenging filter according to the invention.

As shown in FIG. 1 the first embodiment of a scavenging filter generally resembles a cartridge type filter such as commonly used for removal of particles from a fluid stream.

The filter structure comprises an outer cylindrical wall 10, having an annular cross-sectional space 11 therewithin which is open at an annular orifice 12 at the bottom thereof, and closed with a sealant such as a ring seal 13 at the top.

(All positional descriptions are with reference to the orientation shown in the drawing, and not necessarily to the position of the filter in storage or use).

A second thinner cylindrical wall 14 is provided coaxially with the outer wall 10 and defines an inner boundary for the space 11, and an outer wall for a scavenging chamber 15 which occupies the main part of the volume of the filter. The chamber 15 has a false bottom 16 provided by a diffusion filter element which is for example a disc of sintered thermoplastics particles, or a mesh, characterized by a pore size or mesh capable of retaining a scavenging medium in the chamber 15 and allowing liquor to percolate upwards through the false bottom 16 from a space 17 contained between the false bottom 16 and a true floor 18 of the chamber 15.

A tube 19 passes axially down from the top of the chamber 15, to the space 17. The top of the chamber 15 is defined by a funnel shaped shallow downwardly directed conical wall 20, with a central aperture 21 which communicates with the tube 19.

The funnel shaped wall 20 serves to direct liquid medium into the tube 19, and is covered by a filter mesh 22 which provides a strainer to remove solid particles from the liquid before it enters the filter cartridge structure.

The chamber 15 is filled, between false bottom 16 and a shallow dome shaped mesh pressure member, 25 which is loaded by a compression spring 23 the other end of which bears on the underface of the funnel shaped top wall 20, to press upon and retain the filling of chamber 15. This filling comprises a mass of microbeads 24 which comprise a microencapsulated catalyst ligand system such as is described in WO 2005/016510 noted above. These comprise a microcapsule polymer shell which encapsulates either a ligand or a catalyst, and the microcapsules are treated with the other of the catalyst or ligand. These may be used to scavenge impurities from a liquid phase such as heavy metals from contaminated water.

Figure 2:
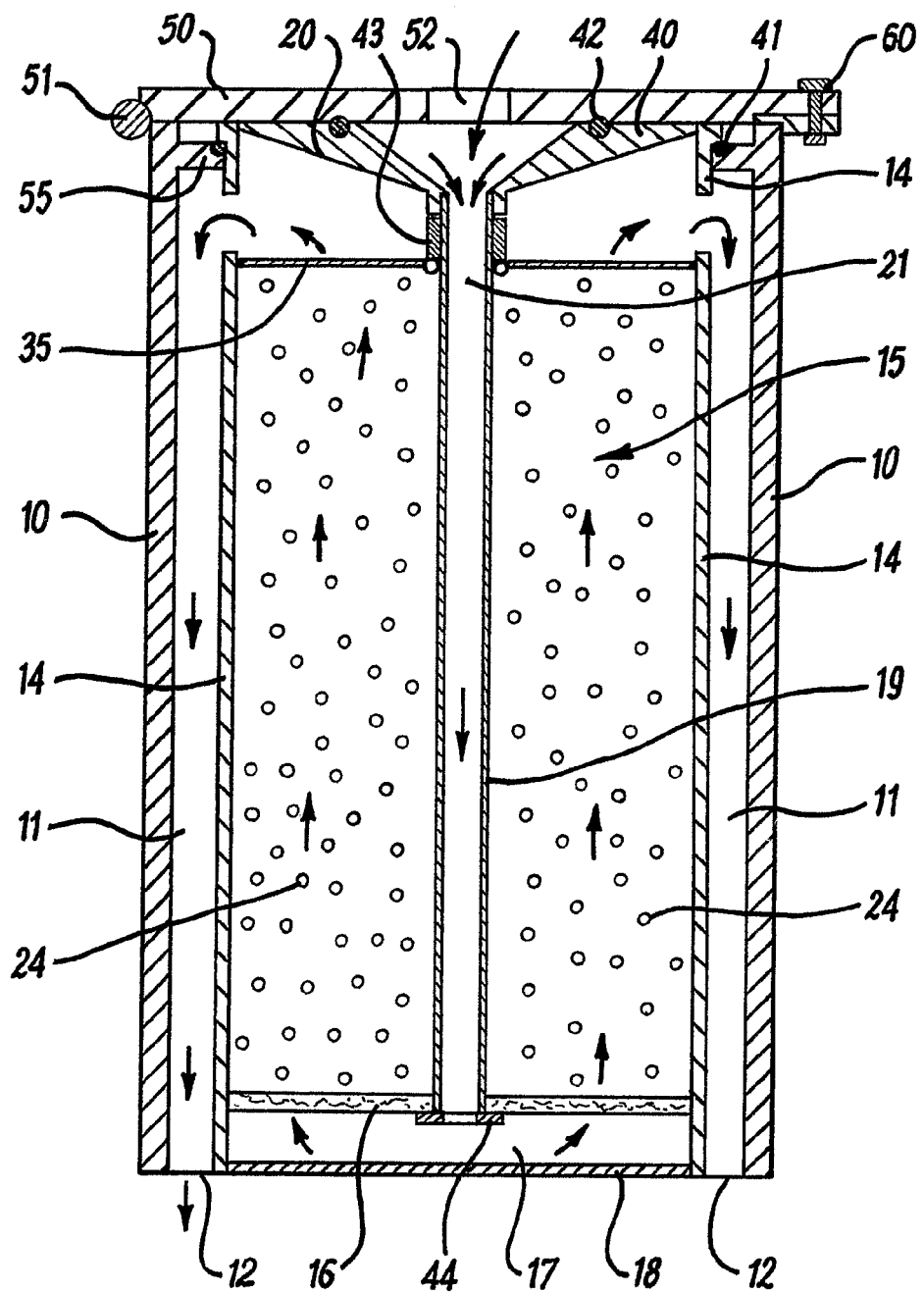
FIG. 2 is a cross-sectional view of a second embodiment of scavenging filter according to the invention.

As shown in FIG. 2, a second embodiment of the invention has an outer unit comprising a wall (10) and lid (50) which is made from metal and contains a cylindrical space in which a disposable cartridge sits. The lid (50) is hinged at (51) and has a central opening (52) through which dirty liquor is fed. At the top of the inner wall of the outer unit, running around the whole inner circumference, is a ridge (55) on which sits the disposable cartridge.

The disposable cartridge has a thick wall (14), made preferably from plastic or another disposable material, into which is screwed a conical-shaped lid (40). When the disposable cartridge is loaded into the outer unit the lid (50) is closed and clamped around the outside, opposite the hinge, by a nut and bolt (60). This clamping then seals the lid against the conical lid of the cartridge with the aid of a seal (42) running in a channel (not shown) in the upper side of the conical lid.

In addition, the outer wall at the top of the cartridge is sealed against the ridge (55) of the inner wall of the unit with the aid of another seal (41). All the seals are rings of rubber or rubber-like materials; material choice dependent on the chemical nature of the liquor.

Hence, with this arrangement, dirty liquor passes into the filter unit through the hole in the lid (52) and is directed down the central aperture (21) to the cavity at the base of the cartridge (17). (Note, the central aperture (21) is screwed in to the conical lid (40) and so does not need further seals to prevent dirty liquor contaminating the clean liquor that exits the scavenging chamber (15)).

Figure 3:
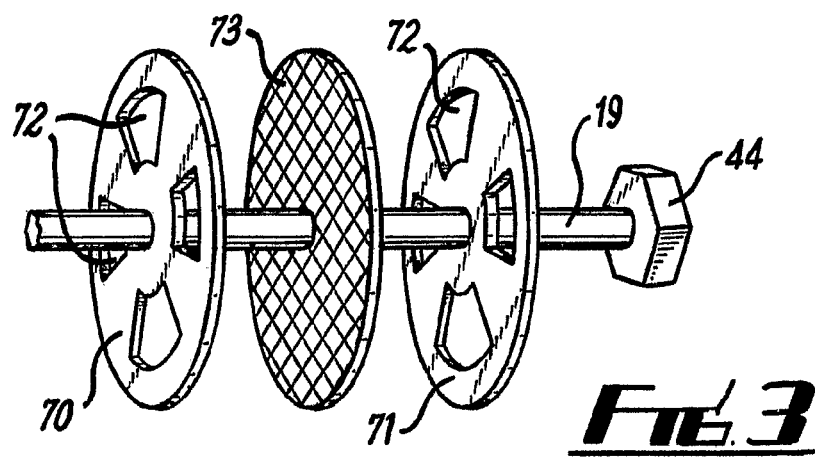
FIG. 3 is an exploded view of part of the filter of FIG. 2.

From here, the liquid passes through the chamber (15) containing scavenging medium (24) in the same manner as FIG. 1, however, due to the natural swelling of the scavenging medium there is now no need for a spring compression device and instead the beads are held in place by a stiff retaining disc (35), which receives downward pressure from a collar (43) that is itself pressed down by the conical lid (40). The retaining disc must be porous while holding in the scavenging medium so ideally it is a matching pair to the false bottom (16). These discs may be sintered polymers, as previously mentioned, or combinations of several discs held on top of each other as in FIG. 3. The composites may be two outer, rigid discs (70, 71) with large openings (72), plus an intermediary disc (73) of woven cloth or mesh. (See FIG. 3). Note that the false bottom (16) is held in place by a locking nut (44) which screws into the tube (19).

Both embodiments have been found to get the best out of the scavenging media cited by the patent, while reducing the complexity of the cartridge. The even flow, with minimum turbulence and reduced air pockets, ensures that the maximum take-up capacity of the media is achieved. Further, the advantageous swelling of the media means that cartridges may not always need the spring compression to immobilize the media.

An alternative filling material comprises polymer micro fibers functionalized by radiation grafting of one or more monomers, the fibers being of a polyolefin, a fluorinated polyethylene, cellulose or viscose. The functional groups may be selected from carboxylic, sulphonic, pyridinium, isothiouronium, phosphonium, amine, thiol or the like, and be prepared by graft copolymerisation. Suitable fibers are described in WO 02/33135, noted above. These can be used for scavenging metals e.g. of the platinum series from organic and/or aqueous solutions.

The liquid medium passes through the mesh 22 which removes solid particles above a given minimum size, and the funnel shaped wall 20 directs the liquid through aperture 21 to the central tube 19, where it descends to the space 17. The liquid is allowed to percolate under the hydrostatic pressure of liquid in tube 19 through the sintered false bottom 16, and up through the mass of scavenging medium 24 through interstices between particles, through the pressure member 25 and through a plurality of apertures 26 near the top of the chamber 26, into the space 11, to flow downwards and out of the annular orifice 12.

The cartridge structure uses a counterflow principle to ensure that the liquid is contacted intimately with the scavenging medium 24, but on the other hand, once the medium is spent, through being saturated with recovered impurities such as heavy metals, the cartridge can be removed from its place in the liquid stream, and replaced with a fresh cartridge containing new or rejuvenated scavenging medium.

Cartridges of this kind can be incorporated at any appropriate location in the conduits or pipe work of a recovery or purification installation.

It will also be realized that by substitution of an appropriate catalytic or reactive, absorptive or adsorptive material, the cartridge construction can be used in a wide range of roles for purification or recovery of liquid streams or of substances from liquid streams from processes or from contaminated supplies. The cartridge can also be used as a containment vessel to house for example polymer-based catalyst attached, incorporated or impregnated onto or into beads or carriers with high surface areas and may incorporate for example tortuous path lengths to cause or assist a chemical reaction to take place to partially or completely remove a contaminant from a fluid.

The invention claimed is:

1. A scavenging filter comprising a cartridge having walls to retain a scavenging medium, and inlet and outlet means to permit flow of a liquid medium having dissolved contaminants therein through the scavenging medium, the scavenging medium configured and arranged to remove the dissolved contaminants from the liquid medium, the cartridge comprising a cylindrical chamber for holding a quantity of the scavenging medium, wherein the chamber has a central tube extending axially down through the chamber, to open into a space below the chamber and separated from the chamber by a false bottom of the chamber thereby allowing liquid to pass up into the chamber, an upper end of the cartridge is formed with a funnel member which directs liquid into the central tube, without retention thereof, to enter the space below the false bottom, the cartridge further comprising an outer wall spaced apart from the walls retaining the scavenging medium, providing an annular cross-sectional space, the annular cross-sectional space in fluid connection with the outlet means and having an annular orifice at a bottom of the cartridge to allow flow of the filtered liquid medium to exit the cartridge, wherein a compression mesh is provided on top of the medium in the chamber and pressed by a spring into contact with the medium, the other end of the spring being seated on the inner face of the funnel member.

2. A scavenging filter according to claim 1, wherein the false bottom comprises a diffusion filter and having a pore or mesh size such as to retain the particles of the scavenging medium in the chamber.

3. A scavenging filter according to claim 2, wherein the diffusion filter comprises a mesh or a sintered porous member.

4. A scavenging filter according to claim 1, wherein the funnel member is covered by a filter mesh through which the liquid passes into the funnel, the mesh acting as a strainer to remove solids from the liquid prior to entry into the scavenging chamber.

5. A scavenging filter according to claim 1 wherein the chamber constitutes a disposable cylindrical member.

6. A scavenging filter according to claim 1 wherein the cartridge constitutes a containment vessel housing a polymer based catalyst attached, incorporated or impregnated onto or into beads or carriers with high surface areas.

* * * * *